March 17, 1953     H. C. RHODES     2,631,550
POWER CURLER
Filed April 25, 1949     2 SHEETS—SHEET 1
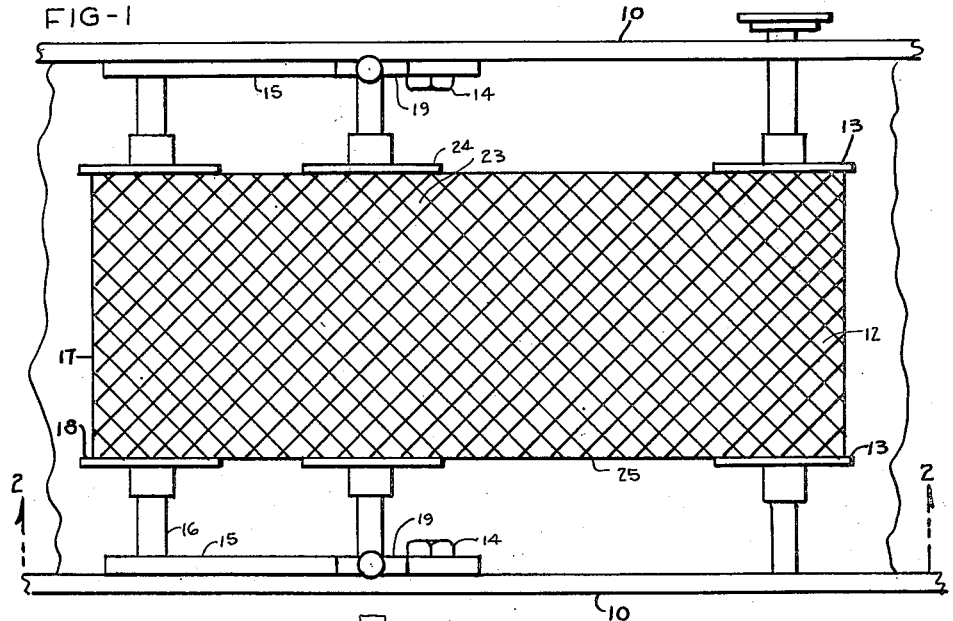
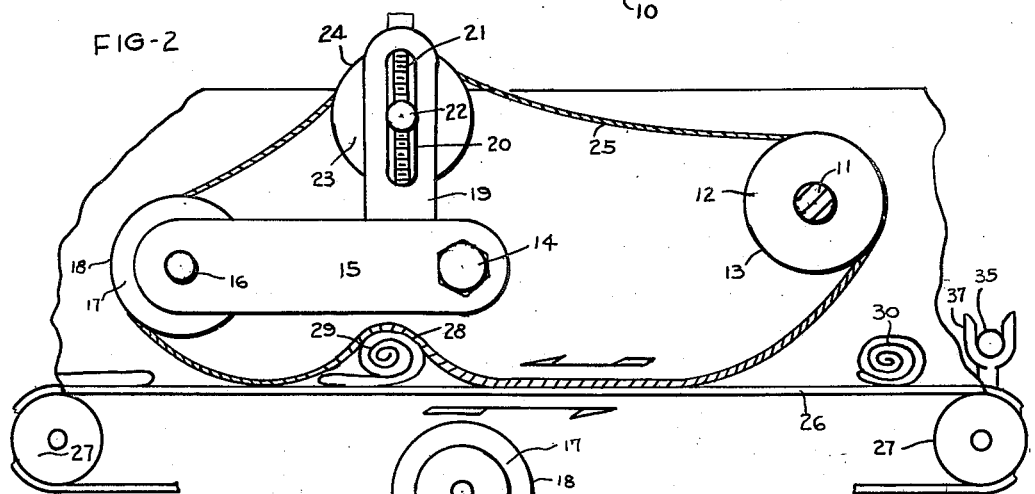
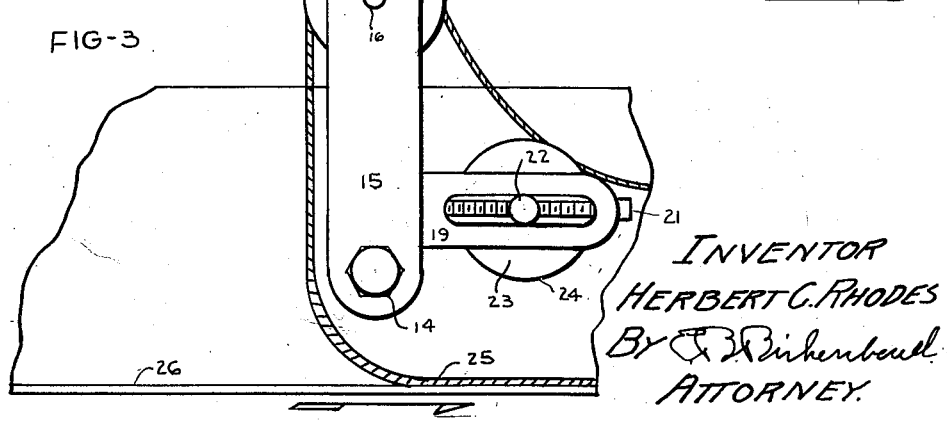
INVENTOR
HERBERT C. RHODES
By   *[signature]*
ATTORNEY March 17, 1953  H. C. RHODES  2,631,550
POWER CURLER
Filed April 25, 1949  2 SHEETS—SHEET 2
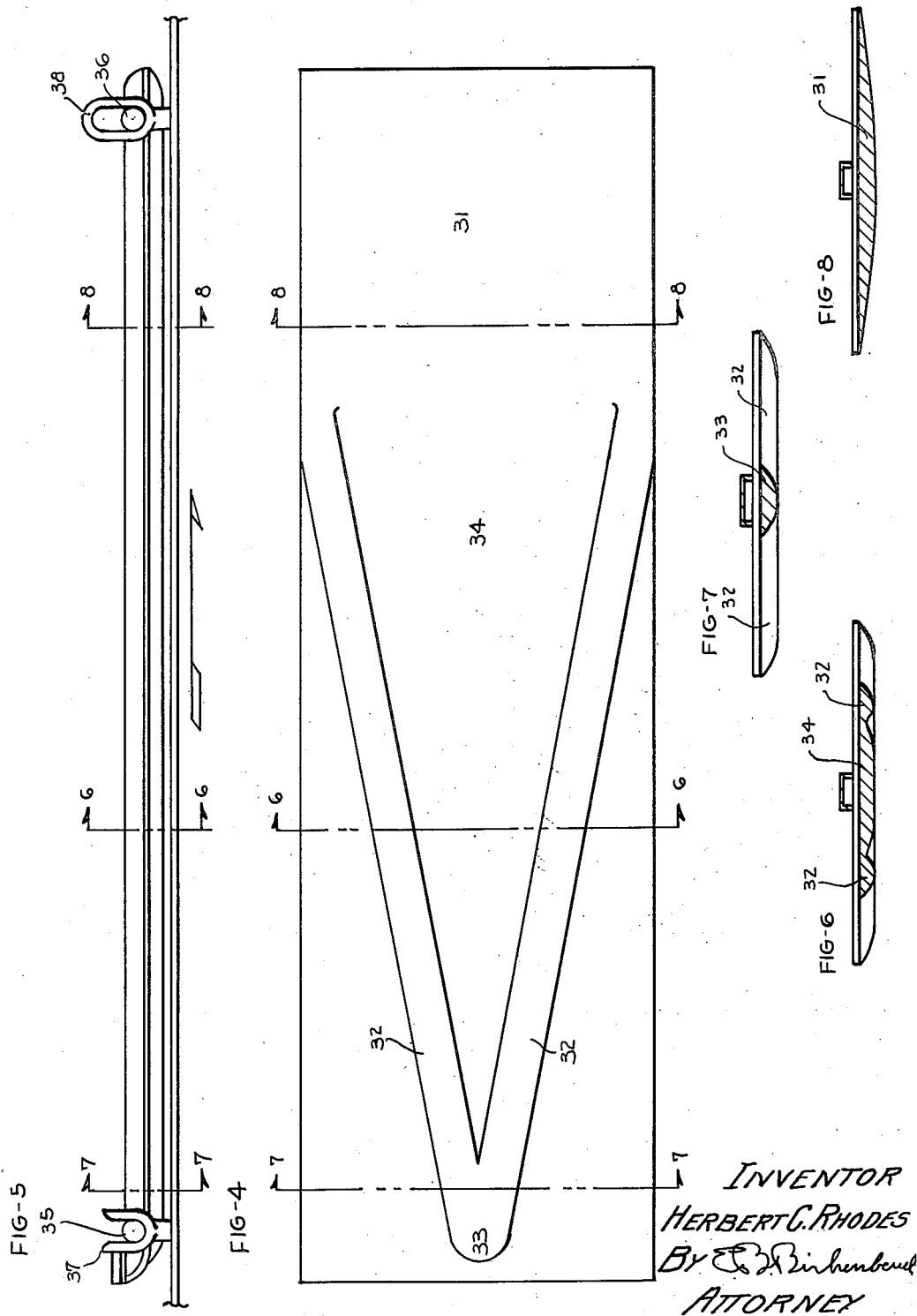
INVENTOR
HERBERT C. RHODES
BY [signature]
ATTORNEY Patented Mar. 17, 1953

2,631,550

UNITED STATES PATENT OFFICE 2,631,550

POWER CURLER

Herbert C. Rhodes, Portland, Oreg., assignor to Read Standard Corporation, a corporation of Delaware Application April 25, 1949, Serial No. 91,165

3 Claims. (Cl. 107—9)

This invention relates generally to dough handling machinery and particularly to a power curler of the type set forth in my application, Serial No. 55,475, filed October 20, 1948, over which this is an improvement, namely, a continuation-in-part thereof.

The main object of this invention is to provide a means for improving the curling operation by the use of a third roll which is adjustable in a vertical direction, which makes it possible to provide a looser or tighter curl.

A second object is to provide a mechanism which has a tendency to lengthen or shorten the curling distance due to the fact that the roll is raised up, thus permitting a smaller amount of the curling mat to rest on the dough belt.

A third object is to provide an improved form of pressure board by means of which the length and diameter of the piece of dough can be accurately controlled and the desired lateral working movement can be provided.

A further object is to so construct and render adjustable the pressure board that the performance thereof can be controlled with the utmost precision.

These and other advantages will become more apparent from the specification following as illustrated in the accompanying drawings, in which:

Fig. 1 is a fragmentary plan of the machine, showing the curling mat and a portion of the dough belt.

Fig. 2 is a vertical section taken along the line 2—2 in Fig. 1.

Fig. 3 is a figure similar to Fig. 2 but showing the parts in an inoperative position as for cleaning.

Fig. 4 is a bottom view of the pressure board.

Fig. 5 is a side elevation of the pressure board and a portion of the dough belt.

Fig. 6 is a transverse section taken along the line 6—6 in Fig. 5.

Fig. 7 is a transverse section taken along the line 7—7 in Fig. 5.

Fig. 8 is a transverse section taken along the line 8—8 in Fig. 5.

Referring in detail to the drawing, there is shown a pair of side frames 10 between which journals the horizontal shaft 11, on which is mounted a roller 12 having the side flanges 13. Hinged to the side frames 10 by means of the bolts 14 are the arms 15 which support the curling mat shaft 16 on which is mounted a roller 17 having the lateral flanges 18 which are in alignment with the flanges 13.

Extending from the arms 15 are the standards 19 having slots 20 in which are journalled the adjusting screws 21 which pass through the non-rotatable shaft 22 on which is mounted a roller 23 having side flanges 24 which align with the flange 13 and 18.

A woven wire chain constituting a curling mat 25 passes around the rollers 12, 17 and 23 and the under side of the curling mat rests upon the dough belt 26 which passes around the pulleys 27 which may be driven in any convenient manner.

It will be noted in Fig. 2 that there is sufficient slack in the curling mat 25 at the point 28 to allow the curling piece of dough 29 to roll between the mat 25 and the dough belt 26. The amount of this slack can be adjusted to a nicety by means of the screws 21, thereby increasing or decreasing the amount of slack available.

From the unit thus far described, the completely curled dough piece 30 travels along on the dough belt 26. Directly above the dough belt 26, at the discharge end of the mat 25, is disposed an elongated pressure board 31 having a pair of rods 32 formed on the bottom thereof, converging to a point 33. The area 34 between the rods 32 is somewhat convex.

The board 31 is supported at its ends by the horizontal rods 35 and 36, the former of which is mounted in the open slotted brackets 37 and the latter of which is mounted in the slotted brackets 38. The pressure board 31 is normally held down by its own weight. The brackets 37 and 38 are preferably made adjustable to limit the downward movement of the pressure board 31.

It can be seen from the foregoing that as the dough piece 30 moves along on the belt 26 and passes under the point 33 of the board 31, it will be rolled from its center portion outwardly a sufficient amount to make the loaf precisely the desired length before it is ready to introduce into the pan. Moreover, the dough piece 30 is worked from the center portion towards the ends in a manner to secure completely uniformity in the loaf texture as well as complete control over the loaf length and diameter.

I claim:

1. In a device for coiling a sheet of dough, an endless carrier belt for conveying sheets of dough on the top run thereof, a pair of longitudinally spaced rotatable pulleys mounted transversely above said carrier belt, an endless coiling mat trained over said pulleys and having sufficient slack in its bottom run for engagement with said carrier belt when the upper run is taut, means for driving said carrier belt and coiling mat with the upper run of the carrier belt and the lower run of the coiling mat traveling in opposite directions, and pivoted supporting means for one of said pulleys pivotally movable for shortening the center distance between said pulleys to lift one end portion of said coiling mat from engagement with said carrier belt.

2. In a device for coiling a sheet of dough, an endless carrier belt for conveying sheets of dough on the top run thereof, a pair of longitudinally spaced rotatable pulleys mounted transversely above said carrier belt, an endless coiling mat trained over said pulleys and having sufficient slack in its bottom run for engagement with said carrier belt when the upper run is taut, means for driving said carrier belt and coiling mat with the upper run of the carrier belt and the lower run of the coiling mat traveling in opposite directions, pivoted supporting means for one of said pulleys pivotally movable for shortening the center distance between said pulleys to lift one end portion of said coiling mat from engagement with said carrier belt, and a tension adjusting idler pulley under the upper run of said coiling mat carried by said pivoted supporting means for varying the amount of slack in the lower run of said coiling mat.

3. In a device for coiling a sheet of dough, an endless carrier belt for conveying sheets of dough on the top run thereof, a pair of pulleys mounted transversely above said carrier belt, said pulleys being disposed parallel with respect to each other and spaced apart longitudinally of each other, an endless coiling mat trained over said pulleys and having sufficient slack in its bottom run for engagement of the major portion of its length with said carrier belt when the upper run is taut, means for driving said carrier belt and coiling mat with the upper run of the carrier belt and the lower run of the coiling mat traveling in opposite directions, normally horizontal longitudinally extending arm like means arranged at one end to support one of said pulleys and being pivoted at the opposite end about an axis parallel to and disposed between the axes of said pulleys, said arm being pivotally movable to an upright position to raise the pulley supported thereon and lift one end of said coiling mat from said carrier belt, and means for securing said arm like means in selected position.

HERBERT C. RHODES.

REFERENCES CITED

The following references are of record in the file of this patent:

UNITED STATES PATENTS

| Number | Name | Date |
|---|---|---|
| 999,089 | Bird | July 25, 1911 |
| 1,171,331 | Embrey | Feb. 8, 1916 |
| 1,479,140 | Kennedy | Jan. 1, 1924 |
| 1,816,844 | Harber | Aug. 4, 1931 |
| 2,173,632 | Peters | Sept. 19, 1939 |
| 2,373,012 | Burdett et al. | Apr. 3, 1945 |
| 2,450,033 | Cohen | Sept. 28, 1948 |

FOREIGN PATENTS

| Number | Country | Date |
|---|---|---|
| 56,372 | Germany | Nov. 25, 1912 |
| 605,416 | France | Feb. 16, 1926 |
| 768,213 | France | May 14, 1934 |